United States Patent [19]

Kuhnert

[11] Patent Number: 4,925,463

[45] Date of Patent: May 15, 1990

[54] EXHAUST GAS CLEANING SYSTEM FOR DIESEL ENGINES

[76] Inventor: Dieter Kuhnert, Fr.-Metz-Str. 18, D-6920 Sinsheim, Fed. Rep. of Germany

[21] Appl. No.: 314,868

[22] PCT Filed: May 31, 1987

[86] PCT No.: PCT/DE87/00245

§ 371 Date: Jan. 30, 1989

§ 102(e) Date: Jan. 30, 1989

[87] PCT Pub. No.: WO87/07324

PCT Pub. Date: Dec. 3, 1987

[30] Foreign Application Priority Data

May 30, 1986 [LU] Luxembourg .......................... 86448
Nov. 18, 1986 [LU] Luxembourg .......................... 86671

[51] Int. Cl.⁵ .......................................... B01D 46/04

[52] U.S. Cl. .......................................... 55/96; 515/273; 515/283; 515/284; 515/523; 515/DIG. 30; 60/303; 60/311

[58] Field of Search .................. 55/96, 282, 284, 285, 55/390, 466, 523, DIG. 30, 273, 283; 60/303, 311

[56] References Cited

U.S. PATENT DOCUMENTS

| | | | |
|---|---|---|---|
| 4,276,066 | 6/1981 | Bly et al. | 60/311 X |
| 4,481,767 | 11/1984 | Stark | 60/303 |
| 4,519,820 | 5/1985 | Oyobe et al. | 55/284 |
| 4,573,317 | 3/1986 | Ludecke | 60/303 |
| 4,641,496 | 2/1987 | Wade | 55/DIG. 30 X |

*Primary Examiner*—Charles Hart
*Attorney, Agent, or Firm*—Edwin E. Greigg

[57] ABSTRACT

The invention concerns an exhaust gas cleaning system for Diesel engines with a filtration device for separating soot from the exhaust gases and a regeneration device for the filtration device. The filtration device is equipped with filter tubes which are closed at one end. Thus, the exhaust gases can be fed in at the other side and penetrate the filter walls. The soot is deposited on the inner surface of the filter tubes. A burner is provided which generates the burn-off gases for the soot, suitable measures being taken to ensure that the burner gases only act on one section of the filter block at a time. Feed and discharge of the exhaust gases are selected in such a way that the cleaned exhaust gases flow around the filter tubes which are being regenerated. The direction of flow of the exhaust gases can also be reversed so that the exhaust gases first flow around the filter tubes passing through the walls into the tube interiors, and then flow out to the discharge through the openings in the tubes. In this case, the soot is deposited on the external surfaces of the filter tubes.

24 Claims, 4 Drawing Sheets

EXHAUST GAS CLEANING SYSTEM FOR DIESEL ENGINES

Figure 1:
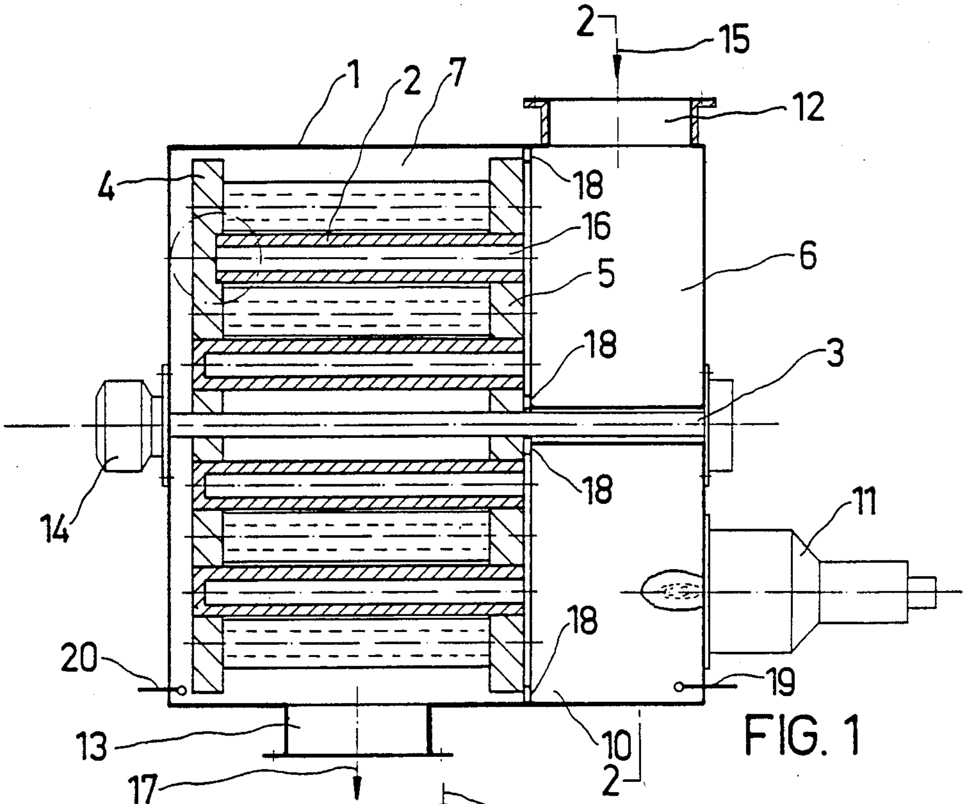

The invention refers to an exhaust gas cleaning system for Diesel engines.

Filtration of the Diesel exhaust gases is necessary because engine measures to reduce soot are not sufficient on their own. A wide variety of devices fitted with filters has already been suggested for this after-treatment of the exhaust gases, using ceramic or electrostatic filters, for example. These filters are used to filter out the soot particles from the exhaust gas, which are deposited on the filter. This results in the necessity for removal of the deposited soot from time to time, so as to preserve the functional capacity of the filter. This process is generally known as filter regeneration.

Thus, SAE Paper No. 850015 describes a device with monolithic ceramic filters and the regeneration of these filters by specific selection of motor setting parameters in conjunction with a filter position close to the engine. However, in this device filter regeneration is subject to substantial random influences, with one of the risks involved being that the filter block will become thermally overloaded.

Regeneration can be improved by the metered addition of metallic additives which are mixed with the fuel, as is described by way of example in SAE Publication No. 860137. However, this causes the further problem of the emission of metallic compounds.

A fundamentally different approach to the filter regeneration problem aims at burning off the soot using an additional burner which is switched on when required and burns away the soot via the burner gases (compare, for example, DE-OS No. 3219948). However, this involves the particular problem of adapting the burner function to the relevant operating status, i.e. exhaust gas volume, exhaust gas temperature and exhaust gas pressure of the engine gases. Even small deviations from the setting required may result in thermal damage to or destruction of the filter.

In order to avoid these difficulties, change-over devices with two identical filters have been suggested, with one filter being located in the exhaust gas flow at any one time and the other being independently regenerated using a burner (DE-OS No. 3204176). The disadvantages of such a device are the large construction volume, the construction expense and the required change-over units which are exposed to the hot, corrosive combustion gases.

For this reason, a proposal has also been made for regenerating the filter sector by sector with an appropriately constructed combustion chamber being passed sector by sector over the filter block (compare, for example U.S. Pat. No. 4,481,767). A major disadvantage here is the fact that because of the variations in heat development and the lever action of the fixing device, the burner cover is distorted which, in turn, means that the cover cannot seal cleanly against those filter sections which are not being regenerated at any particular time.

In order to avoid this disadvantage, the invention proceeds, from kinematic reversal of this known proposal, in which the filter is rotated sector by sector into the vicinity of the burner in the known fashion (U.S. Pat. No. 4,573,317). Apart from its considerable construction expense, this generic device has major disadvantages. These include, in particular, the cooling problem. Since the burner gases and the soot constitute an additional source of heat, a heat sink with direct action should be available to protect the components from thermal overload. Admittedly, a heat sink is present in all the known devices, but this is inadequate so that heat buildup occurs which can very quickly result in the destruction of the filter.

It is in this respect that the invention should provide a remedy, as the proposed system for the cleaning of exhaust gases no longer has the disadvantages mentioned above and also produces additional and substantial advantages.

The filter elements are advantageously designed in the form of tubes, through the sides of which the exhaust gases flow radially, so that a large filter area is available. The exhaust gas can be fed to either the first or the second segment. Thus, exhaust gases to be cleaned are fed in, passed through the filter tubes and their sides, from one chamber section to the next and in doing so, if the chamber is located in the second chamber section, they also pass through those filter tubes within the regeneration sector, which are, in fact, disconnected from the exhaust gas cleaning system by the chamber. This means that a heat exchange process occurs between the filter tubes upstream of the chamber and the filtered exhaust gas flow. This process means that the filter tubes of the regeneration sector are either kept at the correct temperature so that they are already at the same temperature as the exhaust gas when they are pivoted into a filter sector, or the tubes are cooled if the hot burner and soot exhaust gases flow through them when they are burned off and overheat them. Thus, the requirement that heat source and heat sink are spatially adjacent is met here. It is also advantageous that the heat exchange occurs along the entire length of the filter tubes.

Advantageously, according to the invention the regeneration burner can also be switched on when the internal combustion engine is started, so that the cold combustion exhaust gases are heated by the warmed tubes and the normal smoke emission from the cold engine is prevented. This advantage is not present in the known devices.

It is obvious that designing the filter block in the form of several spatially separated tubes with a radial flow will prevent the heat build-up which may occur with the known monoliths (filter candles). An additional advantage here is that the individual filter tubes can be replaced if necessary. According to the invention, ceramic spiral filters or steel wool filters can be used as filter elements, either designed as filter tubes or located within the latter.

According to an advantageous embodiment of the invention, a burner for the generation of hot burn-off gases generated in the chamber can be used as the regeneration means. However, in principle, instead of this, catalytically active substances can be used for regeneration in the chamber, or provision can be made for chemical oxidizing agents to be sprayed in.

According to a further embodiment of the invention, it is particularly useful if the filter tubes are bundled about a central shaft in a rotationally symmetric fashion and sited in the cylindrical drum, with the central shaft running on bearings in the housing as the rotational shaft of the drum.

According to a further embodiment of the invention, the separating walls in the second segment are arranged radially to the rotational shaft extending outwards to the internal wall of the housing, so that a sector-shaped chamber is formed.

According to a useful embodiment of the invention, the filter tubes are connected to one another on the closed side via a disc-shaped wall of the drum and supported by this wall on the shaft so that they cannot be rotated. The filter tubes can run on bearings either on one side or on both sides within the drum. In the event of one-sided fixing, the filter tubes can expand freely and thus reduce tensions; in the case of two-sided bearing methods for the filter tubes with a fixed and a free side, the filter tubes can again expand freely and, in addition, the ceramic material is not subjected to shock loads which might affect the housing. The type of bearing used for the filter tubes is adapted to suit the individual case.

According to a further advantageous embodiment of the invention, the cleaning capacity can be adapted to the actual residual volumes produced by means of the fact that the cycle frequency is variable for the forward rotation of the filter block as a function of the engine load determined over time.

According to a method in accordance with the invention, it is useful to pass the filtered exhaust gases over the regeneration area for cooling or temperature adjustment, so that thermal overload and dew point problems at excessively low temperatures are avoided. Regeneration occurs continuously within the tube-shaped filter element and cleaned combustion exhaust gas flows continuously around the outside of the filter element and cools it. The heat exchange process and the regeneration process take place continuously, in parallel and mutually independently. This heat exchange process is thus stationary. The temperature field is constant, with all the inherent advantages for the process and in terms of material stresses.

Additional characteristics and advantages of the invention can be seen from the dependent claims and the following description of embodiments.

The figures show the following.

Figure 2:
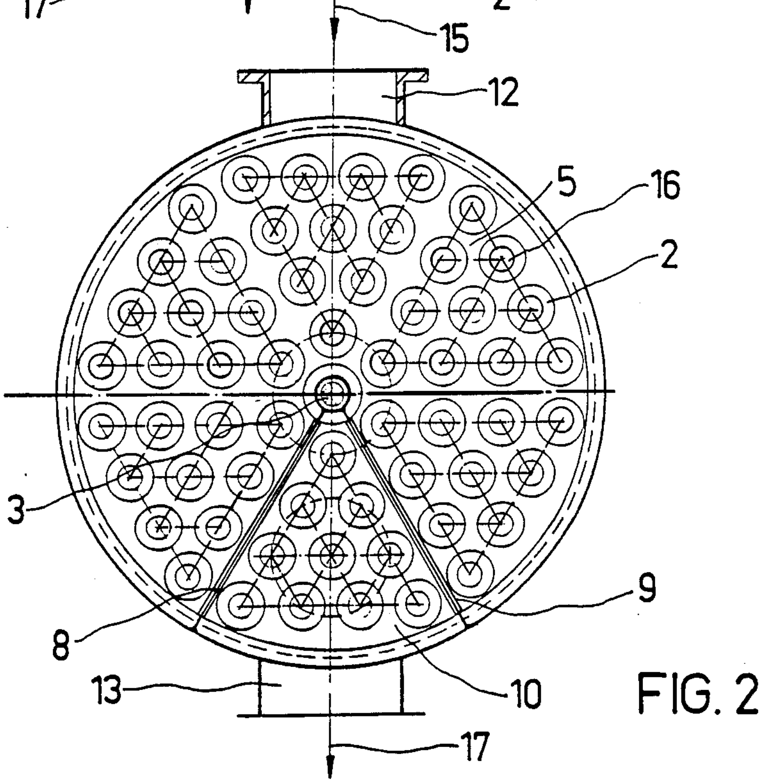
Figure 3:
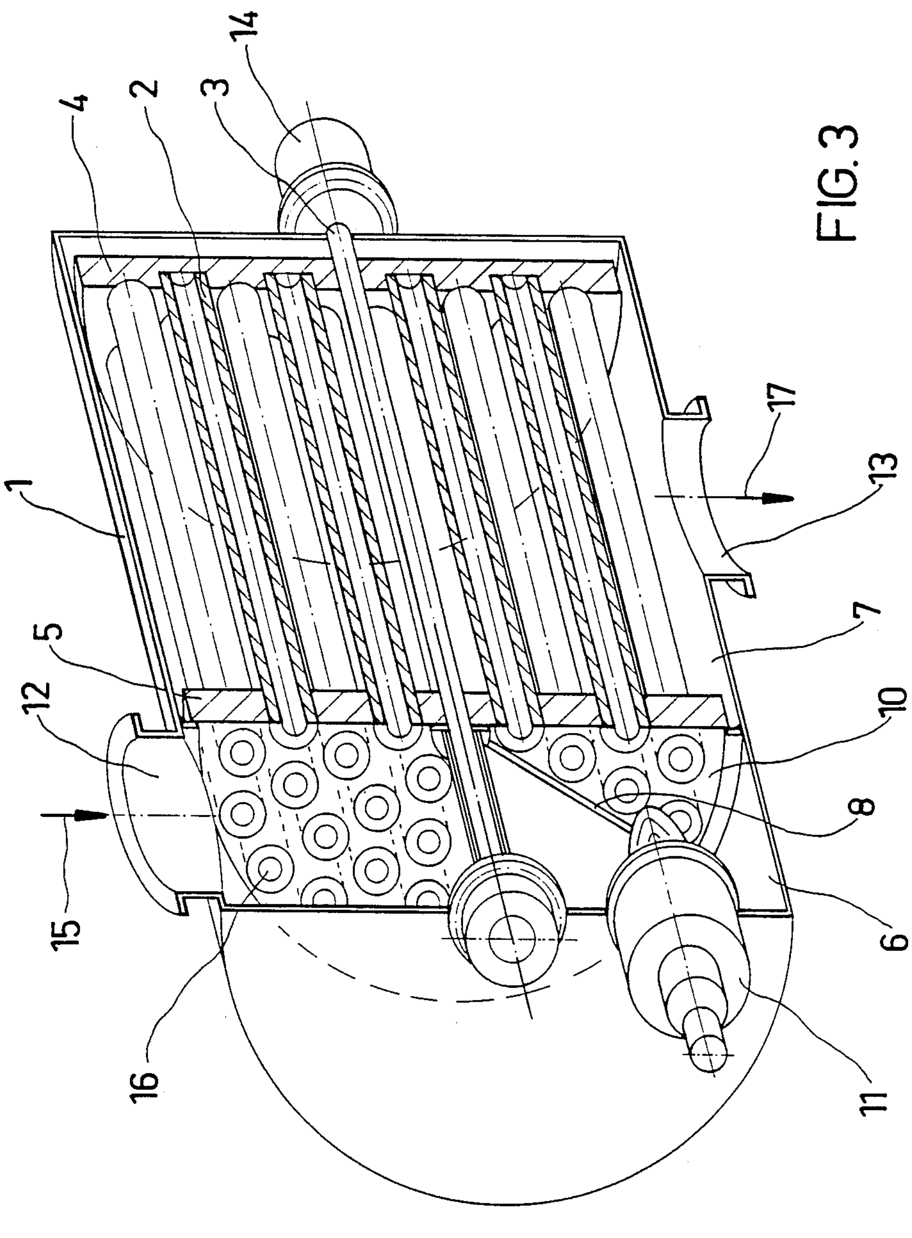
Figure 4:
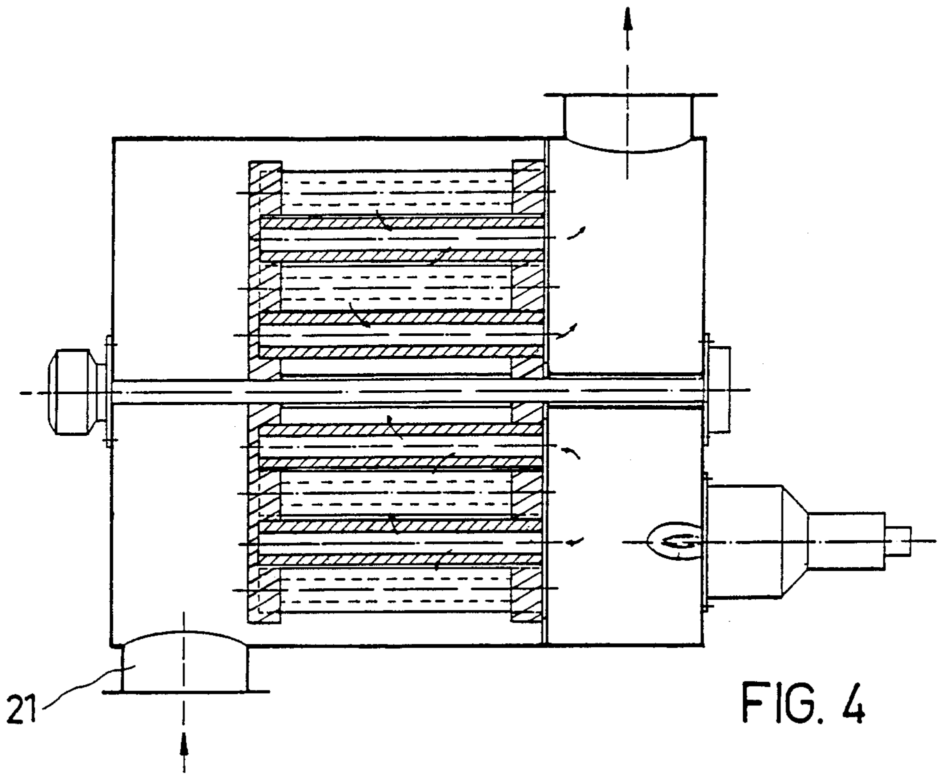
Figure 5:
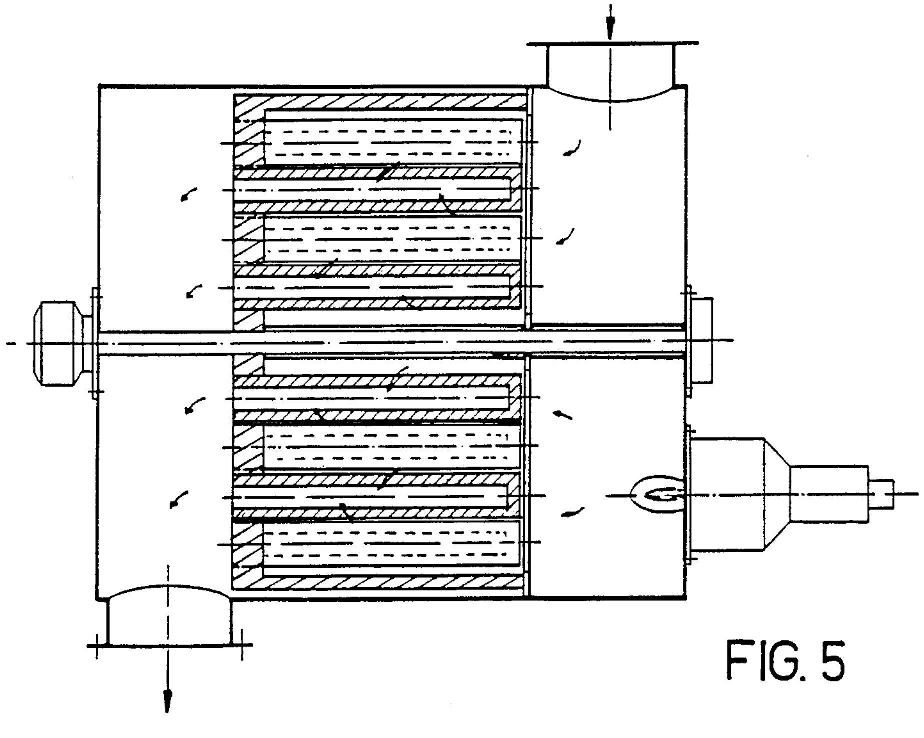
Figure 6:
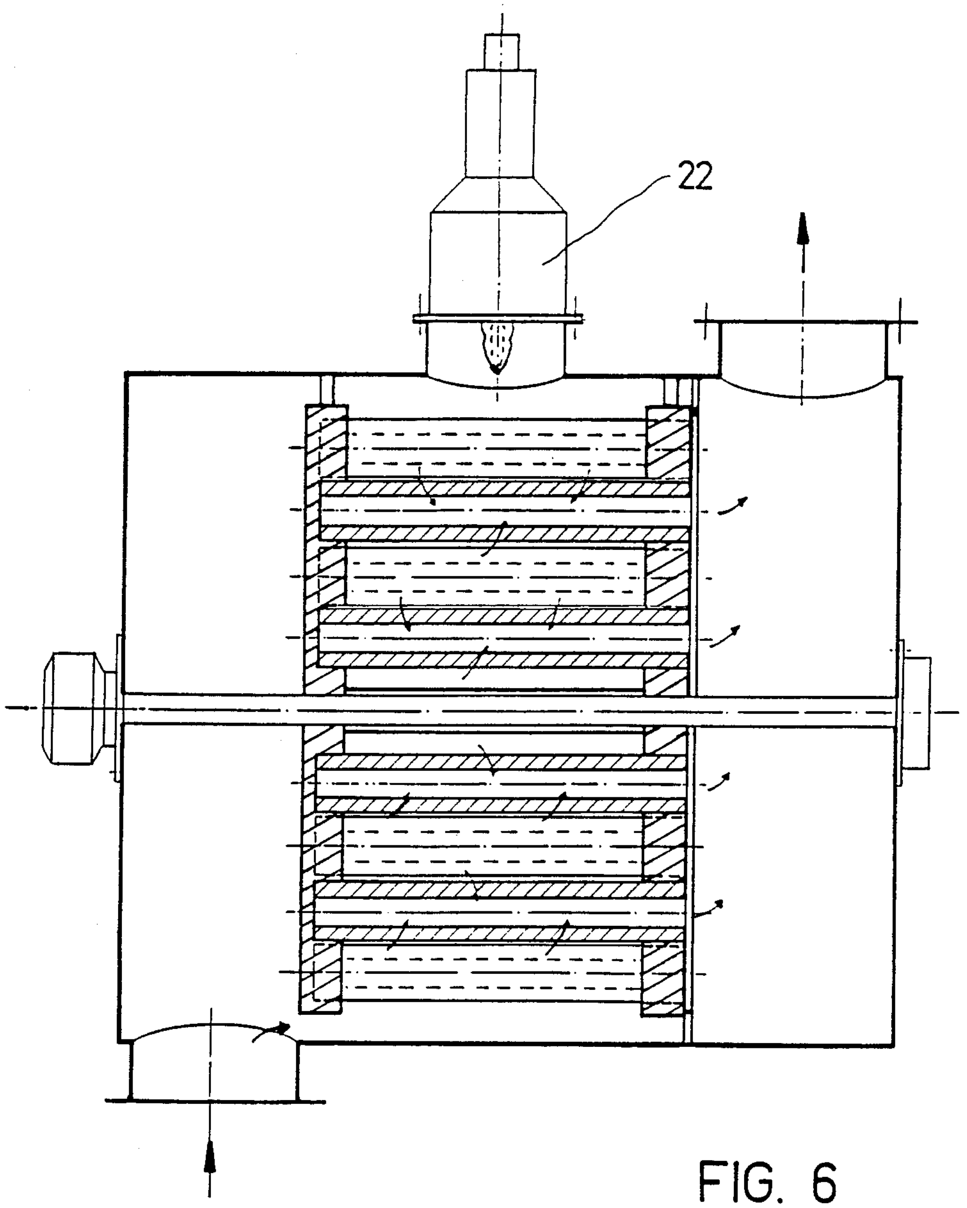

FIG. 1, a section through the exhaust gas cleaning system in accordance with the invention;

FIG. 2, a section through Line II—II in FIG. 1;

FIG. 3, a perspective representation of the new exhaust gas cleaning system; and FIGS. 4–6, additional embodiments of the invention.

FIG. 1 shows a preferred embodiment of the invention.

The filter block is located in the cylindrical housing and comprises the individual filter tubes 2 which are arranged in a rotationally symmetric fashion parallel to the axis, about the central axis 3. The central axis 3 runs on bearings as a shaft in the housing 1. In the representation shown in FIG. 1, the left-hand ends of the filter tubes 2 are inserted into the disc-shaped wall 4 and either sealed at one end by this wall, as shown in the dotted circle, or the tubes 2 penetrate through the wall 4 and are integrally closed off. The walls 4 and 5 are appropriately connected with the shaft 3 so that they can be rotated with shaft 3 and the filter tubes 2 are also rotated with the shaft.

The housing 1 is further subdivided into two mutually sealed sections 6 and 7 by the partition 5. The free ends of the filter tubes 2 run on bearings in the partition 5 in such a way that in this case their openings are flush with the side of the partition 5 which faces the section 6, as can be seen clearly in FIG. 3.

Section 6 serves as the admission section for the exhaust gases to be cleaned, while filtration of the exhaust gases by the filter tubes 2 takes place in section 7. Section 6 is further subdivided by partitions 8 and 9 which extend radially from the shaft 3 to the internal wall of the housing 1 and which are fixed. A sector-shaped chamber 10 is thus obtained which is sealed off from the remaining space and is considerably smaller than the rest of the filtration area. The burner 11 projects into the sector-shaped chamber 10 so that it can be described as the regeneration area. FIG. 2 shows the design of the regeneration area. The exhaust gases to be cleaned are fed in via the connection piece 12 and the cleaned exhaust gases are carried off through the connection piece 13. The filter block which consists of the individual filter tubes and walls 4 and 5 can be rotated in the housing 1 by means of the motor 14 which is shown schematically.

The mode of operation of the exhaust gas cleaning system will be described below.

It is assumed that the filter block is in the position shown in FIG. 1. The exhaust gas flows in the direction of the arrow 15 through the connection piece 12 into the space separated from the regeneration area and thence through the openings 16 of the filter tubes 2. Since the filter tubes 2 are sealed off at the opposite end, the exhaust gases are forced to penetrate the filter walls and this occurs along the entire length of the filter tubes, so that large effective filter areas are obtained. As the gases flow through the tubes 2, the suspended particles, i.e., the soot, are deposited on the internal walls of the filter tubes. On their way to the outflow connection piece 13, the cleaned exhaust gases flow around the filter tubes in the regeneration area, thus exerting a cooling action, and combine with the regeneration gases before flowing out in the direction of arrow 17. No exhaust gases can reach the filter tubes 2 in the regeneration section 10 because of the seal formed by partitions 8 and 9. Instead, the burner gases enter these filter tubes and are thus heated up to the ignition point of the deposited soot so that the soot ignites and burns off. It may be advisable to switch off the burner after this burning-off process has commenced.

After regeneration of the relevant filter tubes, the filter block is rotated by one sector width with the motor 14. Of course, it is also possible to rotate the filter block continuously instead of using cycle operation. Seals 18 are located between the filter block and housing to prevent uncleaned exhaust gases entering the regeneration area. The same applies for the slots between the fixed partitions 8 and 9 and the movable filter block, for which a strip seal is provided, which is not described in any greater detail. The external face of partition 5 slides over this strip seal. In order to reduce wear between the seals and the partition 5, it is useful to remove the load from the seals during rotation by means of slight axial displacement. This can be achieved by axial displacement of the shaft 3, for example, using a suitable lifting means which is not described in any greater detail. Lifting can also, however, be kept so slight or omitted altogether that the rotating surfaces rub against one another, so that the soot on the outsides of the filter tubes is scraped off and these surfaces are also cleaned. In the latter case, the seals 18 described above must be suitably resistant.

In the example described, the filter tubes are cleaned in cyclic fashion; it is possible to determine the cycle time, i.e. the regeneration time, and make it dependent on the amount of soot deposited on the filter tubes, for example. To this end, the deposit condition must be monitored and measured; this can be accomplished using pressure measurements, where the pressure difference between the static pressures upstream and downstream of the regeneration segment is calculated. FIG. 1 indicates sensors 19 and 20 which can be used for this purpose in diagrammatic form. The pressure difference can be measured when the burner has just been started (hot method) or when the burner air has just been started (cold method). The differential pressure measurement is all the more reliable because a defined burner-air flow is present and it is not necessary to depend on the varying operating statuses of the engine exhaust gases.

Another measure, quite well-known, can also be used with the new system for the cleaning of exhaust gases, namely coating with catalytically active substances. It has the advantage of complete combustion of the hydrocarbons absorbed in the soot. This is necessary, in particular, if the desorption of the hydrocarbons by heat transmission occurs more rapidly than the burn-off process, i.e., the exhaust gases would not otherwise be sufficiently combusted. In this context, it is useful and advisable for the catalytic coating to be provided on the discharge side of the filters.

It is easy to see that a wide variety of alterations and supplements to the described exhaust gas cleaning system are left to the expert, without departing from the scope of the invention.

One alteration which is useful for certain applications involves reversal of the direction of flow of the exhaust gases, i.e., the exhaust gases are fed in to the connection piece 13 and discharged from the connection piece 12 after having been cleaned. In this case, the combustion exhaust gases flow around the filter tubes 2 and penetrate their walls, so that the soot is deposited on the external surfaces of the filter tubes 2.

This reversal means that the deposit of residual particles and the admission of the burner gases now occur as an opposed flow, in contrast to FIG. 1, where these two processes occur in a parallel flow.

FIG. 4 shows an embodiment of this type, where the only difference from FIG. 1 is that the inlet connection piece 21 is staggered in relation to the discharge connection piece 13. Otherwise, this system works in precisely the same way as the system described in accordance with FIG. 1, so that further explanation is not necessary.

On the other hand, it is possible to reverse the direction of flow of the exhaust gases again in the example in FIG. 4. In this case, it is necessary for the left-hand ends of the filter tubes 2 to be open and the right-hand ends of the filter tubes 2 to be closed, as can be seen from the flow arrows in FIG. 5 which will not be described in any further detail. Thus, here, too, soot deposit also occurs on the external surfaces of the filter tubes 2, but so is the supply of the hot burner gases, so that a parallel flow is formed again. In this example, in order to separate the regeneration area from the rest of the filter block, radial partitions are present in the filter block, separating it into sections whose cross section is identical to that of the combustion chamber.

It is also possible to locate the burner 11 otherwise than shown in FIGS. 1 to 5. FIG. 6, which corresponds to FIG. 4, shows an alteration of this type where the burner 22 acts at the circumference of the filter block. Here, too, partitions are required in the filter block as indicated in the previous example. Once again, deposit of the residual particles and admission of the hot burner gases occur in a parallel flow. A detailed description is not necessary since the mode of action of this example corresponds to the embodiment described in the previous paragraph.

All the characteristics described in the description, the claims below and the drawing may constitute the substance of the invention, either individually or in any combination.

I claim:

1. An exhaust gas cleaning system for Diesel engines including a filtration device for separating soot from the exhaust gases and a regeneration device for the filtration device, comprising a separate regeneration sector with the admission of regeneration means for the soot; said filtration device comprises a number of filter elements, preferably arranged equidistantly, the filter elements being located in a rotatable drum which can be pivoted on bearings within a housing which is sealed to prevent leakage of the exhaust gases and has an admission and discharge line; one wall of said drum subdivides the housing into two parts with holes to allow axial throughflow of the exhaust flow between the first section containing the filter elements and a second section towards which the filter elements are open ended and in which regeneration takes place relative to said filter elements, depending on the rotational position of the drum, in one single corresponding section of the filtration device; said filter elements (2) are tube-shaped and closed off at one end by a wall (4) such that the exhaust gases flow radially through the filter tube (2) and axially through a perforated wall (5), and include partitions (8 and 9) which run parallel to the filter tubes and are present between the perforated wall (5) of the drum and the housing wall and situated relative to the walls (4 and 5) of the drum, forming a chamber (10) in at least one of the sections (6, 7) for the regeneration means.

2. An exhaust gas cleaning system for Diesel engines in accordance with claim 1, in which a burner for the generation of hot burn-off gases is used as the regeneration means, the gases being generated in the chamber (10).

3. An exhaust gas cleaning system for Diesel engines in accordance with claim 1 in which said filter elements (2) are located in the drum in a rotationally symmetric fashion parallel to the axis and about a shaft (3) and that the shaft (3) is connected flush with the drum.

4. An exhaust cleaning system for Diesel engines in accordance with claim 3, in which said partitions (8 and 9) in the second section (6) extend radially from the shaft (3) in a fixed position to an internal wall of the housing and are fixed with respect to this wall so that a sector-shaped combustion chamber (10) is formed.

5. An exhaust gas cleaning system for Diesel engines in accordance with claim 4, in which said combustion chamber (10) is in a fixed position and the drum with the filter elements can be rotated, particularly in a stepwise fashion, with the steps being the size of a sector upstream of the combustion chamber (10).

6. An exhaust gas cleaning system for Diesel engines in accordance with claim 5, in which a cycle frequency for further drum (filter block) rotation can be varied as a function of the engine load determined over time.

7. An exhaust gas cleaning system for Diesel engines in accordance with claim 2, in which the axis of the burner (11) is parallel to the axes of the filter elements (2).

8. An exhaust gas cleaning system for Diesel engines in accordance with claim 4, which includes a connection piece (13) for discharging the filtered exhaust gases and that the axis of this connection piece (13) lies roughly along the axis of symmetry of the sector-shaped combustion chamber and the center plane of the first section (7).

9. An exhaust gas cleaning system for Diesel engines in accordance with claim 1, in which the closed end of the filter elements (2) are interconnected via a disc-shaped drum wall (4) and supported on the shaft (3) by this wall (4) in a manner fixed against rotation relative to each other.

10. An exhaust gas cleaning system for Diesel engines in accordance with claim 1, which includes a control means for switching on the regeneration process by a decrease in pressure of the exhaust gas in the sector to be regenerated.

11. An exhaust gas cleaning system for Diesel engines in accordance with claim 1, in which said filter elements (2) are coated with catalytically active substances on the external surface on the flow side.

12. An exhaust gas cleaning system for Diesel engines in accordance with claim 1, in which seals (18) are provided between the housing (1) and the front wall (5) and that when the drum (filter block) is operated with cyclic rotation the front wall (5) lifts away from the seals (18) for the rotation operation.

13. An exhaust gas cleaning system for Diesel engines in accordance with claim 1, in which the direction of flow of the exhaust gases is reversible.

14. An exhaust gas cleaning system for Diesel engines in accordance with claim 2, in which said burner (22) is located on the housing (1) in such a way that the flame direction is perpendicular to the filter element (2) (FIG. 6).

15. An exhaust gas cleaning system for Diesel engines in accordance with claim 2, in which said filter elements (2) are located in the drum in a rotationally symmetric fashion parallel to the axis and about a shaft (3) and that the shaft (3) is connected flush with the drum.

16. An exhaust gas cleaning system for Diesel engines in accordance with claim 3, in which the axis of the burner (11) is parallel to the axes of the filter elements (2).

17. An exhaust gas cleaning system for Diesel engines in accordance with claim 5, which includes a connection piece (13) for discharging the filtered exhaust gases and that the axis of this connection piece (13) lies roughly along the axis of symmetry of the sector-shaped combustion chamber and the center plane of the first section (7).

18. An exhaust gas cleaning system for Diesel engines in accordance with claim 6, which includes a connection piece (13) for discharging the filtered exhaust gases and that the axis of this connection piece (13) lies roughly along the axis of symmetry of the sector-shaped combustion chamber and the center plane of the first section.

19. An exhaust gas cleaning system for Diesel engines in accordance with claim 2, in which the closed end of the filter elements (2) are interconnected via a disc-shaped drum wall (4) and supported on the shaft (3) by this wall (4) in a manner fixed against rotation relative to each other.

20. An exhaust gas cleaning system for Diesel engines in accordance with claim 2, which includes a control means for switching on the regeneration process by a decrease in pressure of the exhaust gas in the sector to be regenerated.

21. An exhaust gas cleaning system for Diesel engines in accordance with claim 2, in which said filter elements (2) are coated with catalytically active substances on the external surface on the flow side.

22. An exhaust gas cleaning system for Diesel engines in accordance with claim 2, in which seals (18) are provided between the housing (1) and the front wall (5) and that when the drum (filter block) is operated with cyclic rotation the front wall (5) lifts away from the seals (18) for the rotation operation.

23. A method for cleaning exhaust gases of a Diesel engine which comprises directing the exhaust gases into one end of a closed housing containing a plurality of filter tubes in a closed portion of said housing adjacent said closed end with each of said tubes having one end closed, directing the exhaust gases through said filter tubes, to collect soot on an inner surface thereof, rotating said plurality of filter tubes thereby positioning said filter tubes in a vicinity of a self-contained regeneration means in said one end of said closed housing, regenerating said filter tubes in the vicinity of said regeneration means, and rotating said plurality of filter tubes thereby moving other filter tubes to the vicinity of said regenerating means to regenerate said filter tubes and successively rotating said filter tubes to said regeneration means until all filter tubes have been regenerated.

24. A method for the cleaning of Diesel exhaust gases in accordance with claim 23, in which the exhaust gases which have already been filtered to remove soot particles can be used for a heat exchange process in a regeneration area operating by thermal means.

* * * * *